(12) United States Patent
Huang et al.

(10) Patent No.: US 11,779,443 B2
(45) Date of Patent: Oct. 10, 2023

(54) ROTATION TYPE ELECTRIC TOOTHBRUSH

(71) Applicant: THUMBS UP CROSS BORDER E-COMMERCE CO., LTD., Zhuhai (CN)

(72) Inventors: Jiacheng Huang, Zhuhai (CN); Yubin Li, Zhuhai (CN); Xiu Zou, Zhuhai (CN); Zhidong Wang, Zhuhai (CN); Lilin Xu, Zhuhai (CN); Hongtao Zhao, Zhuhai (CN); Yuqiang Zhao, Zhuhai (CN); Rongjin Zheng, Zhuhai (CN)

( * ) Notice: Subject to any disclaimer, the term of this patent is extended or adjusted under 35 U.S.C. 154(b) by 475 days.

(21) Appl. No.: 17/002,171

(22) Filed: Aug. 25, 2020

(65) Prior Publication Data
US 2021/0093430 A1    Apr. 1, 2021

(30) Foreign Application Priority Data
Sep. 27, 2019    (CN) .......................... 201921628500.4

(51) Int. Cl.
*A61C 17/34* (2006.01)
*A46B 5/00* (2006.01)
*A61C 17/22* (2006.01)

(52) U.S. Cl.
CPC ........ *A61C 17/3436* (2013.01); *A46B 5/0095* (2013.01); *A61C 17/222* (2013.01); *A61C 17/225* (2013.01)

(58) Field of Classification Search
CPC ..... A61C 17/16; A61C 17/32; A61C 17/3436; A61C 17/222; A61C 17/225
See application file for complete search history.

(56) References Cited

U.S. PATENT DOCUMENTS

| | | | |
|---|---|---|---|
| 9,439,741 B2 * | 9/2016 | Dishon | .................... A46B 9/04 |
| 2008/0189886 A1 * | 8/2008 | Jimenez | ............... A61C 17/349 |
| | | | 15/22.4 |

FOREIGN PATENT DOCUMENTS

EP     2550936 A1 *   1/2013        A61C 17/222

* cited by examiner

*Primary Examiner* — Shay Karls (57) ABSTRACT

The present disclosure provides a rotation type electric toothbrush. The electric toothbrush includes a brush handle module, a vibration module and a brush head module having a brush base, a brush cover and bristles. The brush cover and the brush base are in a detachable connection. The bristles are disposed on the brush base. The brush base includes a groove. The vibration module includes a motor and an eccentric shaft having a transmission connection with the motor. The eccentric shaft inserts into the groove. When the rotation type electric toothbrush is working, the eccentric shaft rotates eccentrically to contact a side surface of the groove, so as to drive the brush base and the brush cover to have a reciprocating rotation synchronously.

20 Claims, 7 Drawing Sheets

ROTATION TYPE ELECTRIC TOOTHBRUSH

CROSS-REFERENCE TO RELATED APPLICATIONS

This application claims priority of Chinese Patent Application No. 201921628500.4, entitled "A ROTATION TYPE ELECTRIC TOOTHBRUSH" filed on Sep. 27, 2019, the entire contents of which are incorporated by reference herein.

FIELD OF THE INVENTION

The present disclosure relates to household electrical appliances technology field, and specifically to a rotation type electric toothbrush.

BACKGROUND OF THE INVENTION

Electric toothbrushes have become an important part of oral health care at home and abroad. A brush head of an electric toothbrush vibrates in a high frequency through a motor to decompose toothpaste into foam and then cleans gaps between teeth by the foam. At the same time, the vibration of the brush head can promote oral blood circulation and achieve the function of gum massage.

Electric toothbrushes are divided into two types including a rotation type and a vibration type. As for the existing rotation type electric toothbrush, the brush head cleans teeth by full rotation, it may bring large noise, more power consumption and short usage time. In addition, this full rotation type electric toothbrush may be easy to hit teeth and harm teeth and gums, such that the safety of the existing electric toothbrush is low.

SUMMARY OF THE INVENTION

In order to overcome the disadvantage of the existing electric toothbrush, the present disclosure provides a rotation type electric toothbrush.

The present disclosure adopts the following technical solution: a rotation type electric toothbrush including a brush head module having a brush base, a brush cover and bristles, the brush cover and the brush base being in a detachable connection, the bristles disposed on the brush base, the brush base including a groove; a brush handle module; and a vibration module including a motor and an eccentric shaft having a transmission connection with the motor, the eccentric shaft inserting into the groove, and when the rotation type electric toothbrush is working, the eccentric shaft rotates eccentrically to contact a side surface of the groove so as to drive the brush base and the brush cover to have a reciprocating rotation synchronously.

Further, the brush handle module includes a handle and a fixing base integrated molding with the handle, the handle includes an accommodation space to fix the vibration module, and the brush base and the brush cover are located at two sides of the fixing base.

Further, the fixing base includes a first connection portion and at least one arc-shaped track slot, the first connection portion includes a first connection hole, and the at least one track slot is symmetrical about the first connection hole.

Further, the brush base includes a second connection portion corresponding to the first connection portion, the groove is located at the second connection portion, and the second connection portion includes a second connection hole corresponding to the first connection hole and at least one third connection hole corresponding to the at least one track slot.

Further, the brush cover includes a third connection portion located at an end surface and corresponding to the first connection portion and at least one post able to insert into the at least one third connection hole, the third connection portion includes a fourth connection hole corresponding to the first connection hole, and a shaft passes through the first connection hole, the second connection hole and the fourth connection hole to connect the fixing base, the brush base and the brush cover.

Further, another end surface of the brush cover opposite to the end surface includes a plurality of soft particles made of thermo plastic elastomer materials to avoid teeth injure.

Further, the vibration module includes a post portion and a fourth connection portion, the motor is disposed at a small end of the post portion, and the fourth connection portion is disposed adjacent to the motor.

Further, the handle further includes a fifth connection hole disposed adjacent to a front part of the accommodation space, the vibration module further includes a connection post, the vibration module is located at the accommodation space, the eccentric shaft inserts into the groove, and the connection post inserts into the fifth connection hole to connect the fourth connection portion and the handle.

Further, allowable rotation angles of the rotation type electric toothbrush are in a range of 0 degree to 60 degrees.

Further, the eccentric shaft includes a shaft portion and a spherical end connected the shaft portion, and the spherical end is configured to rotate eccentrically to contact the side surface of the groove so as to drive the brush base and the brush cover.

The present disclosure also adopts the following technical solution: a rotation type toothbrush including: a brush head module having a brush base and bristles, the bristles disposed on the brush base, the brush base including a groove; a vibration module including a motor and an eccentric shaft having a transmission connection with the motor, the eccentric shaft inserting into the groove, the eccentric shaft configured to rotate eccentrically to contact a side surface of the groove so as to drive the brush base and the bristles to have a reciprocating rotation; and a brush handle module configured to fix the vibration module.

Further, the brush handle module includes a handle and a fixing base integrated molding with the handle, the handle includes an accommodation space to fix the vibration module, and the brush base is located at one side of the fixing base.

Further, the fixing base includes a first connection portion and at least one arc-shaped track slot, the first connection portion includes a first connection hole, and the at least one track slot is symmetrical about the first connection hole.

Further, the brush base includes a second connection portion corresponding to the first connection portion, the groove is located at the second connection portion, and the second connection portion includes a second connection hole corresponding to the first connection hole and at least one third connection hole corresponding to the at least one track slot.

Further, the brush head module further includes a brush cover connected to a side far away from the bristles of the brush base, the brush cover includes a third connection portion located at an end surface and corresponding to the first connection portion and at least one post able to insert into the at least one third connection hole, the third connection portion includes a fourth connection hole corresponding to the first connection hole, and a shaft passes through the first connection hole, the second connection hole and the fourth connection hole to connect the fixing base, the brush base and the brush cover.

Further, another end surface of the brush cover opposite to the end surface includes a plurality of soft particles made of thermo plastic elastomer materials to avoid teeth injure.

Further, the vibration module includes a post portion and a fourth connection portion, the motor is disposed at a small end of the post portion, and the fourth connection portion is disposed adjacent to the motor.

Further, the handle further includes a fifth connection hole disposed adjacent to a front part of the accommodation space, the vibration module further includes a connection post, the vibration module is located at the accommodation space, the eccentric shaft inserts into the groove, and the connection post inserts into the fifth connection hole to connect the fourth connection portion and the handle.

Further, allowable rotation angles of the rotation type electric toothbrush are in a range of 0 degree to 60 degrees.

Further, the eccentric shaft includes a shaft portion and a spherical end connected the shaft portion, and the spherical end is configured to rotate eccentrically to contact the side surface of the groove so as to drive the brush base and the bristles.

The present disclosure also has the beneficial effects: the eccentric shaft rotates eccentrically to contact a side surface of the groove so as to drive the brush base to have a reciprocating rotation, because the contact area between the eccentric shaft and the side surface of the groove can be small, the noise of the rotation type electric toothbrush is small. In addition, the rotation of the electric toothbrush of present disclosure is not full rotation type, it brings less power consumption and long usage time. Furthermore, the soft particles of the brush cover can avoid hitting teeth and protect teeth and gums.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION OF THE ILLUSTRATED EMBODIMENT

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

In view of the disadvantage of the existing rotation type electric toothbrush, the present disclosure provides a rotation type electric toothbrush. Referring to FIGS. 1-7, the rotation type electric toothbrush includes a brush head module 1, a brush handle module 2 and a vibration module 3. The brush handle module 1 includes a brush base 101, a brush cover 102 and bristles A. The brush cover 102 and the brush base 101 are in a detachable connection and can be assembled together, such that the brush base 101 and the brush cover 102 are bale to have a reciprocating rotation synchronously. The brush base 101 and the brush cover 102 can be assembled easily, thus it is convenient to change broken elements and it need not to change the whole brush head module 1 so as to have reduced cost. The vibration module 3 includes a motor 301 and an eccentric shaft 302 having a transmission connection with the motor 301. The motor 301 is configured to drive the eccentric shaft to rotate eccentrically, and the vibration module 3 has a simple structure.

The bristles A are disposed on a surface away from the brush cover 102 of the brush base 102 along a direction vertical to the surface. The brush base 101 includes a groove 103, and the eccentric shaft 302 inserts into the groove 103. When the rotation type electric toothbrush is working, the eccentric shaft rotates eccentrically to contact a side surface of the groove 103 so as to drive the brush base 101 and the brush cover 102 to have a reciprocating rotation synchronously. The eccentric shaft 302 includes a shaft portion 3021 and a spherical end 3022 connected the shaft portion 3021. A diameter of the spherical end 3022 is substantially the same as a width of the groove 103, such that the eccentric shaft 302 is located at the groove 103 to contact at least one surface of the groove 103 in a small point contact area. Due to the small point contact area, the noise of the rotation type electric toothbrush can be reduced. In other embodiment, the eccentric shaft 302 and the at feast one surface of the groove 103 may have a line contact area, it also can reduce the noise of the rotation type electric toothbrush. It can be understood, in above embodiments, the point contact and the line contact between the eccentric shaft 302 and the at least one surface of the groove 103 have the same principle. In addition, the rotation of the electric toothbrush is not full rotation type, that is allowable rotation angles of the electric toothbrush are in a range of 0 degree to 60 degrees, and it brings less power consumption and long usage time.

Figure 1:
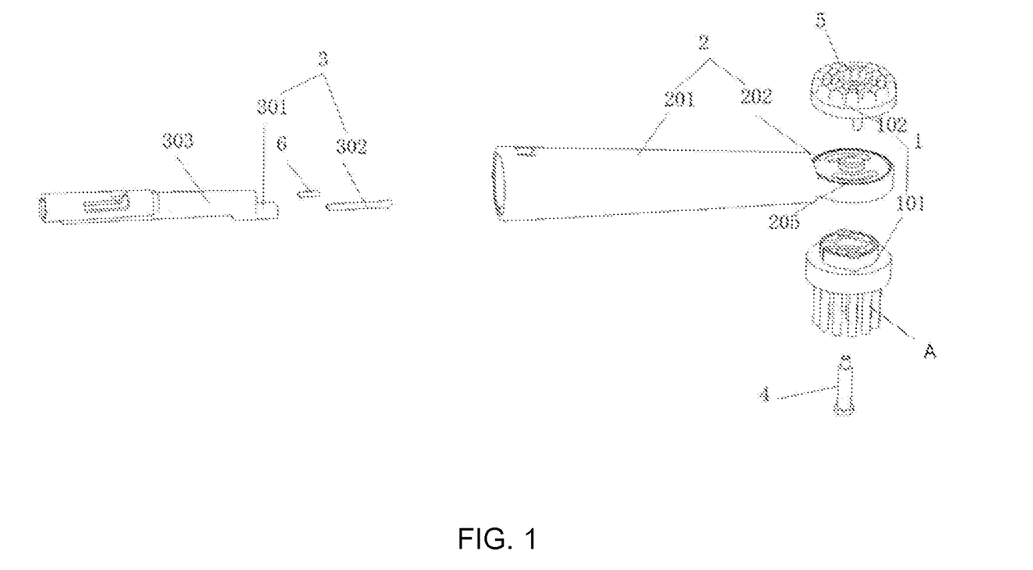
FIG. 1 is an exploded view of a rotation type electric toothbrush according to one embodiment of the present disclosure.
Figure 5:
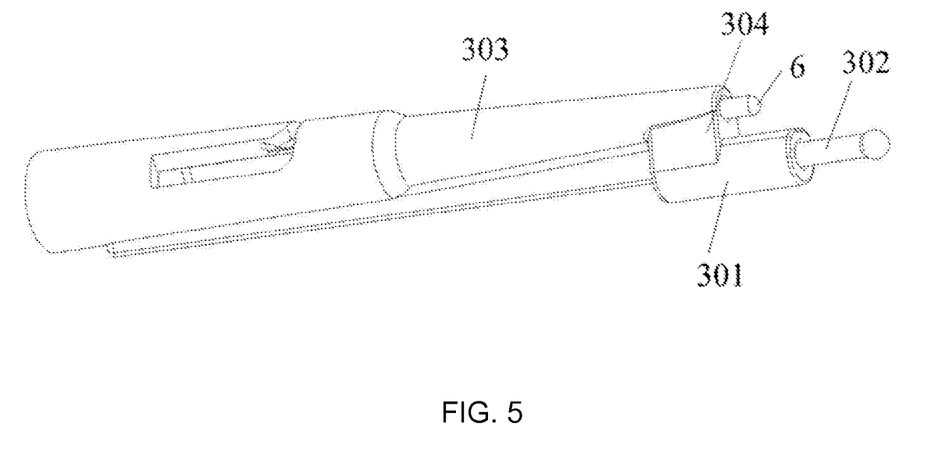
FIG. 5 is a schematic diagram of the brush handle module of FIG. 4.

Further, referring to FIG. 1, the brush handle module 2 includes a handle 201 and a fixing base 202 integrated molding with the handle 201. The handle 201 includes an accommodation space to fix the vibration module 3, and the brush base 101 and the brush cover 102 are located at two opposite sides of the fixing base 202. Referring to FIG. 5, the handle 201 has a tube structure with out surface having a certain incline angle, that conforms to the ergonomic design and increases the comfort of holding. The fixing base 202 is closed to a small end of the handle 201, and a side surface of the fixing base 202 is linked to the accommodation space. The brush base 101 and the brush cover 102 have a rotation connection with two opposite end surfaces of the fixing base 202 respectively.

Figure 2:
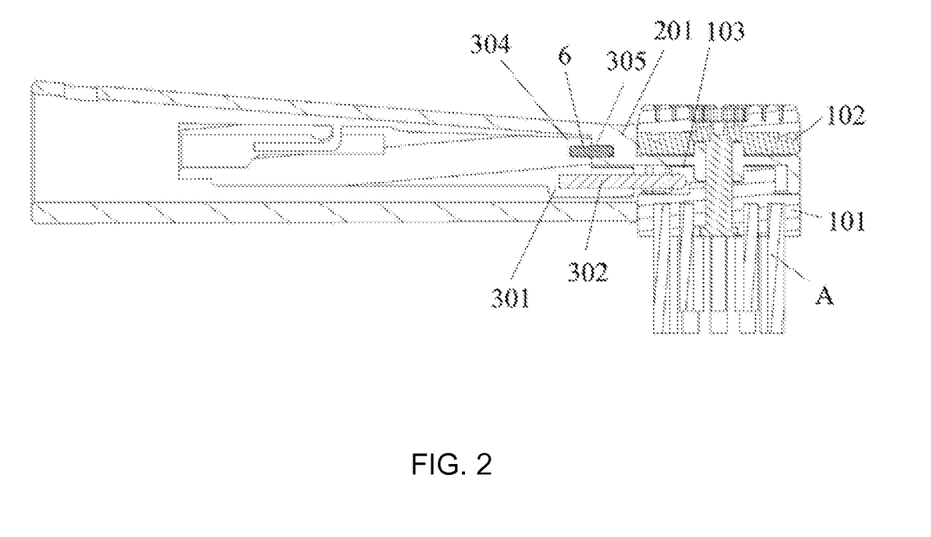
FIG. 2 is a cross-section view of the rotation type electric toothbrush of FIG. 1.
Figure 3:
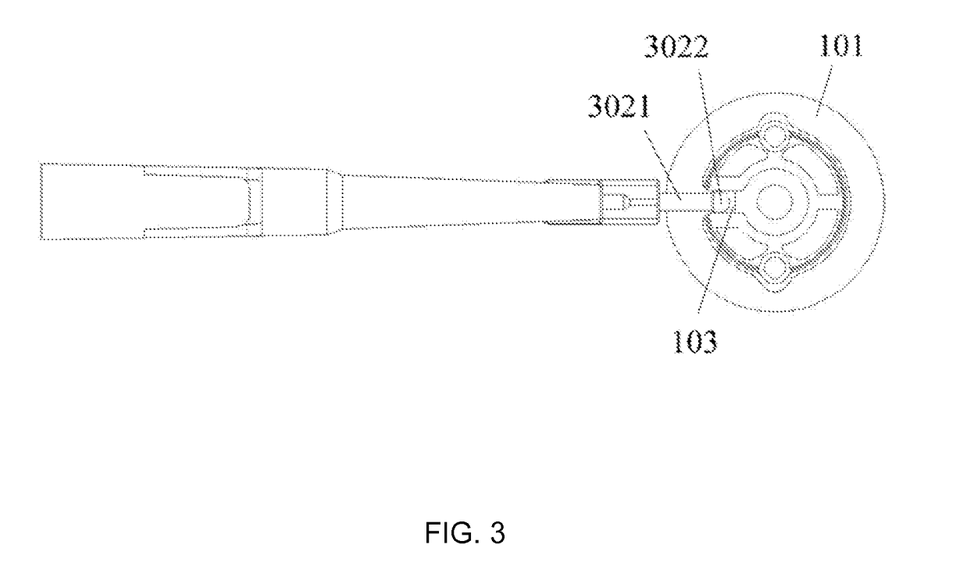
FIG. 3 is a top view of the rotation type electric toothbrush of FIG. 1.
Figure 4:
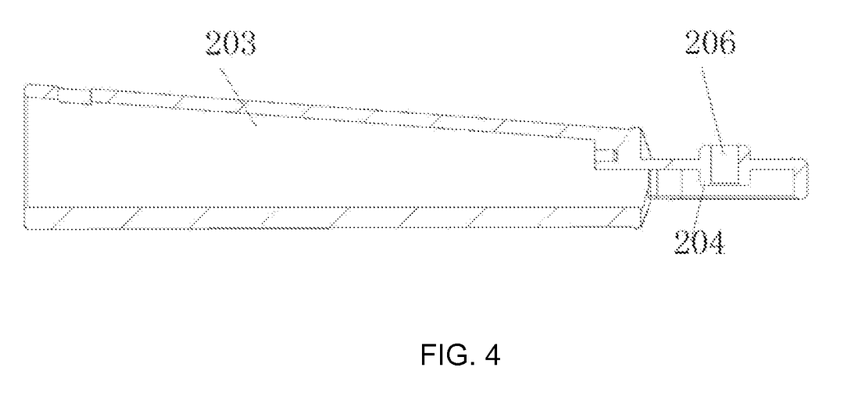
FIG. 4 is a cross-section view of a brush handle module of the rotation type electric toothbrush of FIG. 1.

Further, the fixing base 202 includes a first connection portion 204 and two arc-shaped track slots 205. The first connection portion 204 includes a first connection hole 206. The two track slots 205 are symmetrical about the first connection hole 206. Referring to FIG. 1 and FIG. 2, the surface connected the brush base 101 of the fixing base 202 depresses to form the track slots 205. The track slots 205 extend along a round shaped outline of the fixing base 201. Two ends of each track slot 205 and a circle center of the fixing base 201 define a rotation angle with the range from 0 degree to 60 degrees.

Figure 6:
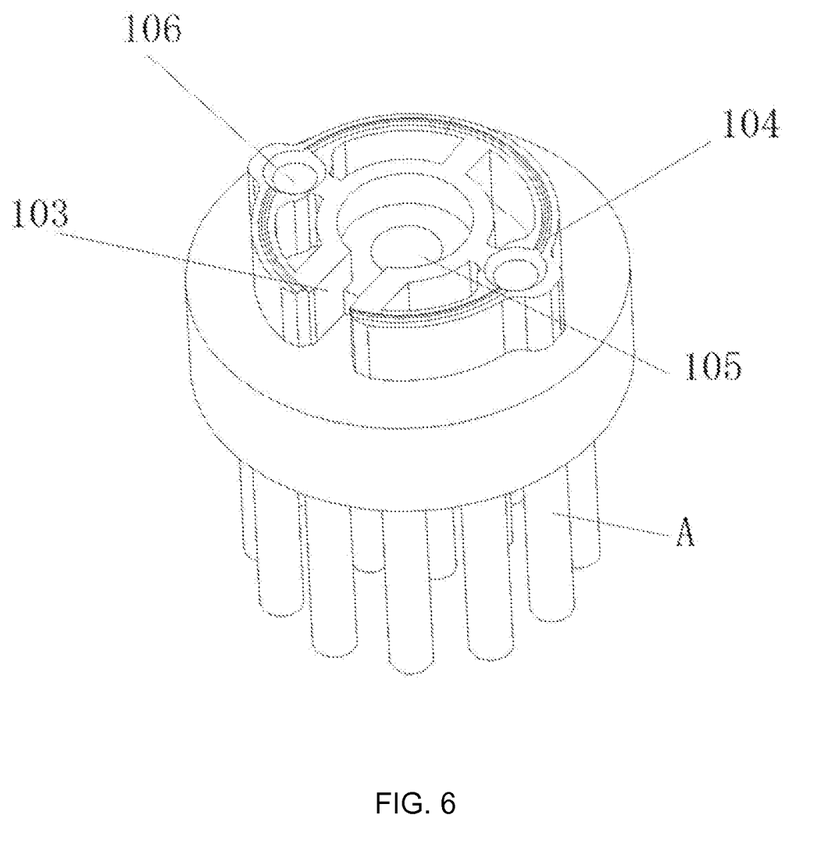
FIG. 6 is a schematic diagram of a brush base of the rotation type electric toothbrush of FIG. 1.

Further, referring to FIGS. 1 and 6, the brush base 101 includes a second connection portion 104 corresponding to the first connection portion 204, the groove 103 is located at the second connection portion 104. The second connection portion 104 includes a second connection hole 105 corresponding to the first connection hole 105 and two third connection hole 106 corresponding to the two track slots 205. The first connection portion 204 is fastened to the corresponding second connection portion 104. A gap is located between the brush base 101 and the fixing base 202 so as to reduce the friction and the noise.

Figure 7:
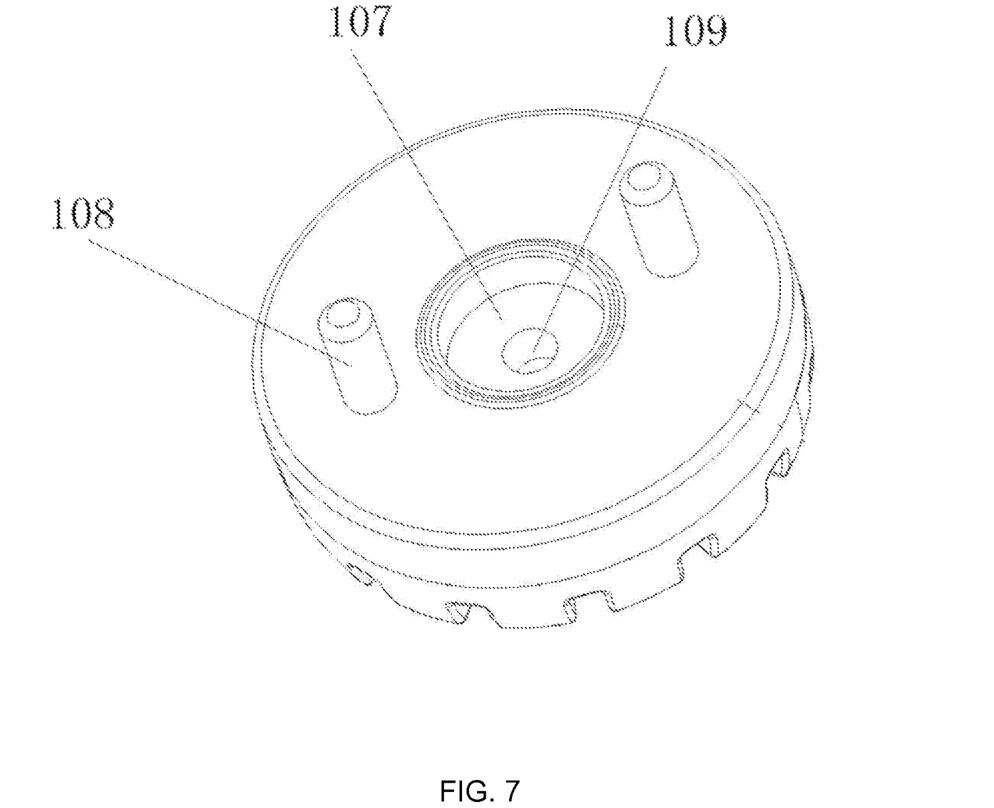
FIG. 7 is a schematic diagram of a brush cover of the rotation type electric toothbrush of FIG. 1.

In addition, the brush cover 102 includes a third connection portion 107 located at an end surface adjacent to the brush base 101 and corresponding to the first connection portion 204. The third connection portion 107 is fastened to another end of the fixing base 202 far away from brush base 101. A gap is also located between the brush cover 102 and the fixing base 202 so as to reduce the friction and the noise.

The brush cover 102 further includes two posts 108 able to insert into the two third connection holes 106 via the two track slots 205 respectively. The third connection portion 107 includes a fourth connection hole 109 corresponding to the first connection hole 206, and a shaft 4 passes through the first connection hole 206, the second connection hole 105 and the fourth connection hole 109 to connect the fixing base 202, the brush base 101 and the brush cover 102. An end of the shaft 4 includes a groove, and a flanging process can be provided to the end of the shaft 4 so as to press the third connection portion 107 of the brush cover 102, and then the brush head module 1 can be assembled.

In order to avoid hitting teeth, referring to FIG. 1, another end surface of the brush cover 102 opposite to the end surface connected to the post 108 includes a plurality of soft particles made of thermo plastic elastomer materials. The soft particles is configured to clean tongue and protect teeth and gums, and the safety of the rotation type electric toothbrush can be improved.

Further, the vibration module 3 includes a post portion 303 and a fourth connection portion 304, the motor 301 is disposed at a small end of the post portion 303, and the fourth connection portion 304 is disposed adjacent to the motor 301. The handle 201 further includes a fifth connection hole 305 disposed adjacent to a front part of the accommodation space. The vibration module 3 further includes a connection post 6, the vibration module 3 is located at the accommodation space, and the eccentric shaft 302 inserts into the groove 103. The connection post 6 inserts into the fifth connection hole 305 to connect the fourth connection portion 304 and the handle 201. When the rotation type electric toothbrush is working, the eccentric shaft 302 rotates eccentrically to drive the brush base 101, the brush cover 102 and the bristles A to have a reciprocating rotation synchronously, such that the teeth can be cleaned by the bristles A.

The present disclosure also has the beneficial effects: the eccentric shaft rotates eccentrically to contact a side surface of the groove so as to drive the brush base to have a reciprocating rotation, because the contact area between the eccentric shaft and the side surface of the groove can be small, the noise of the rotation type electric toothbrush is small. In addition, the rotation of the electric toothbrush of present disclosure is not full rotation type, it brings less power consumption and long usage time. Furthermore, the soft particles of the brush cover can avoid hitting teeth and protect teeth and gums.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. A rotation type electric toothbrush, comprising:
a brush head module comprising a brush base, a brush cover and bristles, the brush cover and the brush base being in a detachable connection, the bristles disposed on the brush base, the brush base comprising a groove;
a brush handle module; and
a vibration module comprising a motor and an eccentric shaft having a transmission connection with the motor, the eccentric shaft inserting into the groove,
wherein when the rotation type electric toothbrush is working, the eccentric shaft rotates eccentrically to contact a side surface of the groove so as to drive the brush base and the brush cover to have a reciprocating rotation synchronously,
wherein the brush handle module comprises a handle and a fixing base integrated molding with the handle, the handle comprises an accommodation space to fix the vibration module, and the brush base and the brush cover are located at two sides of the fixing base, wherein the fixing base comprises a first connection portion and at least one arc-shaped track slot, the first connection portion comprises a first connection hole, and the at least one track slot is symmetrical about the first connection hole.

2. The rotation type electric toothbrush of claim 1, wherein the brush base comprises a second connection portion corresponding to the first connection portion, the groove is located at the second connection portion, and the second connection portion comprises a second connection hole corresponding to the first connection hole and at least one third connection hole corresponding to the at least one track slot.

3. The rotation type electric toothbrush of claim 2, wherein the brush cover comprises a third connection portion located at an end surface and corresponding to the first connection portion and at least one post able to insert into the at least one third connection hole, the third connection portion comprises a fourth connection hole corresponding to the first connection hole, and a shaft passes through the first connection hole, the second connection hole and the fourth connection hole to connect the fixing base, the brush base and the brush cover.

4. The rotation type electric toothbrush of claim 3, wherein another end surface of the brush cover opposite to the end surface comprises a plurality of soft particles made of thermo plastic elastomer materials to avoid teeth injure.

5. The rotation type electric toothbrush of claim 1, wherein the vibration module comprises a post portion and a fourth connection portion, the motor is disposed at a small end of the post portion, and the fourth connection portion is disposed adjacent to the motor.

6. The rotation type electric toothbrush of claim 5, wherein the handle further comprises a fifth connection hole disposed adjacent to a front part of the accommodation space, the vibration module further comprises a connection post, the vibration module is located at the accommodation space, the eccentric shaft inserts into the groove, and the connection post inserts into the fifth connection hole to connect the fourth connection portion and the handle.

7. The rotation type electric toothbrush of claim 1, wherein allowable rotation angles of the rotation type electric toothbrush are in a range of 0 degree to 60 degrees.

8. The rotation type electric toothbrush of claim 1, wherein the eccentric shaft comprises a shaft portion and a spherical end connected the shaft portion, and the spherical end is configured to rotate eccentrically to contact the side surface of the groove so as to drive the brush base and the brush cover.

9. The rotation type electric toothbrush of claim 1, wherein the at least one arc-shaped track slot comprises two arc-shaped slots, and the two arc-shaped slots are symmetrically located at two sides of the first connection hole.

10. A rotation type toothbrush, comprising:
a brush head module comprising a brush base and bristles, the bristles disposed on the brush base, the brush base comprising a groove;
a vibration module comprising a motor and an eccentric shaft having a transmission connection with the motor, the eccentric shaft inserting into the groove, the eccentric shaft configured to rotate eccentrically to contact a side surface of the groove so as to drive the brush base and the bristles to have a reciprocating rotation; and
a brush handle module configured to fix the vibration module,
wherein the brush handle module comprises a handle and a fixing base integrated molding with the handle, the handle comprises an accommodation space to fix the vibration module, and the brush base is located at one side of the fixing base,
wherein the fixing base comprises a first connection portion and at least one arc-shaped track slot, the first connection portion comprises a first connection hole, and the at least one track slot is symmetrical about the first connection hole.

11. The rotation type electric toothbrush of claim 10, wherein the brush base comprises a second connection portion corresponding to the first connection portion, the groove is located at the second connection portion, and the second connection portion comprises a second connection hole corresponding to the first connection hole and at least one third connection hole corresponding to the at least one track slot.

12. The rotation type electric toothbrush of claim 11, wherein the brush head module further comprises a brush cover having a detachable connection with a side far away from the bristles of the brush base, the brush cover comprises a third connection portion located at an end surface and corresponding to the first connection portion and at least one post able to insert into the at least one third connection hole, the third connection portion comprises a fourth connection hole corresponding to the first connection hole, and a shaft passes through the first connection hole, the second connection hole and the fourth connection hole to connect the fixing base, the brush base and the brush cover.

13. The rotation type electric toothbrush of claim 12, wherein another end surface of the brush cover opposite to the end surface comprises a plurality of soft particles made of thermo plastic elastomer materials to avoid teeth injure.

14. The rotation type electric toothbrush of claim 10, wherein the vibration module comprises a post portion and a fourth connection portion, the motor is disposed at a small end of the post portion, and the fourth connection portion is disposed adjacent to the motor.

15. The rotation type electric toothbrush of claim 14, wherein the handle further comprises a fifth connection hole disposed adjacent to a front part of the accommodation space, the vibration module further comprises a connection post, the vibration module is located at the accommodation space, the eccentric shaft inserts into the groove, and the connection post inserts into the fifth connection hole to connect the fourth connection portion and the handle.

16. The rotation type electric toothbrush of claim 10, wherein allowable rotation angles of the rotation type electric toothbrush are in a range of 0 degree to 60 degrees.

17. The rotation type electric toothbrush of claim 10, wherein the eccentric shaft comprises a shaft portion and a spherical end connected the shaft portion, and the spherical end is configured to rotate eccentrically to contact the side surface of the groove so as to drive the brush base and the bristles.

18. The rotation type electric toothbrush of claim 10, wherein the at least one arc-shaped track slot comprises two arc-shaped slots, and the two arc-shaped slots are symmetrically located at two sides of the first connection hole.

19. A rotation type toothbrush, comprising:
a brush head module comprising a brush base and bristles, the bristles disposed on the brush base, the brush base comprising a groove;
a vibration module comprising a motor and an eccentric shaft having a transmission connection with the motor, the eccentric shaft inserting into the groove, the eccentric shaft configured to rotate eccentrically to contact a side surface of the groove so as to drive the brush base and the bristles to have a reciprocating rotation; and a brush handle module configured to fix the vibration module, wherein the brush handle module comprises a handle and a fixing base connected with the handle, the handle comprises an accommodation space to fix the vibration module, and the brush base is located at one side of the fixing base, wherein the fixing base comprises a first connection portion and at least one arc-shaped track slot, the first connection portion comprises a first connection hole, and the at least one track slot is symmetrical about the first connection hole.

20. The rotation type electric toothbrush of claim 19, wherein the at least one arc-shaped track slot comprises two arc-shaped slots, and the two arc-shaped slots are symmetrically located at two sides of the first connection hole.

\* \* \* \* \*